Sept. 1, 1964 R. A. ORLANDO 3,147,448
FOUR LAYER DIODE SWEEP SEARCH AFC CIRCUIT
Filed Jan. 30, 1961
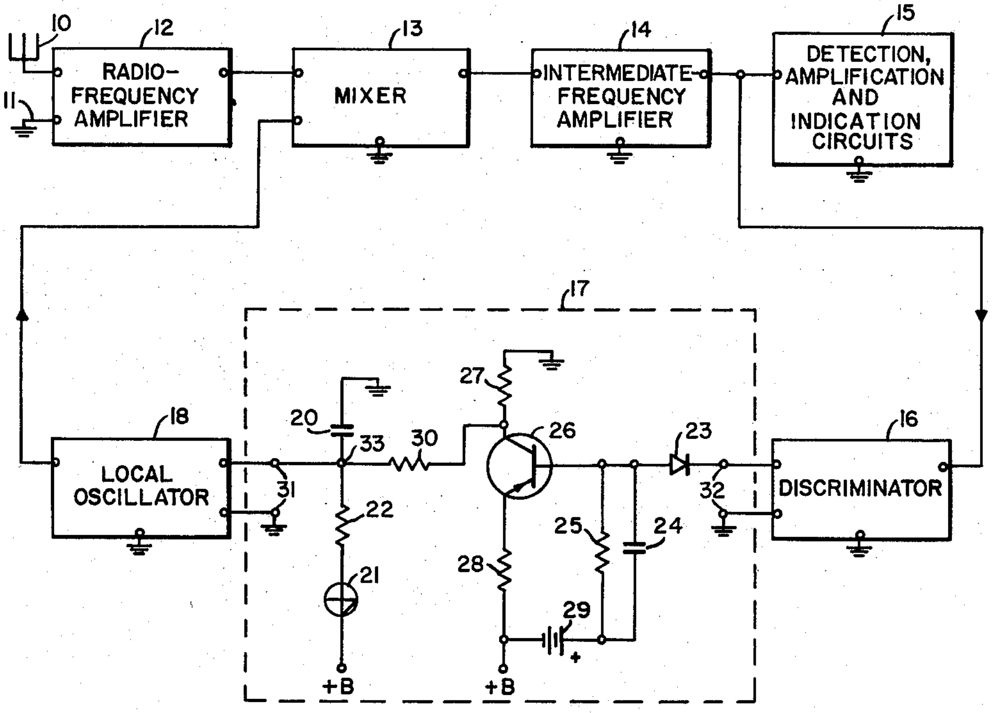

3,147,448

FOUR LAYER DIODE SWEEP SEARCH AFC CIRCUIT

Ronald A. Orlando, Levittown, N.Y., assignor to Hazeltine Research, Inc., a corporation of Illinois Filed Jan. 30, 1961, Ser. No. 85,740
6 Claims. (Cl. 331—4)

This invention relates to an improved control circuit and more particularly to an automatic local oscillator frequency control circuit having special applicability to radar receiving equipment. While the invention will be described in detail in the environment of a radar receiver, the invention is not limited to such applications.

The problem of automatically controlling the local oscillator in a radar set has existed over a long period. A common occurrence of this problem may be briefly described as follows: in a radar receiver where the frequency of incoming signals may vary over a certain predetermined range, it is required that the local oscillator accurately track the incoming frequency so that an intermediate-frequency of, for example, 30 megacycles, is maintained as the input frequency changes. Thus, a control circuit is required which will sweep the local oscillator over its frequency range when incoming signals of unknown frequency are received and which will lock the local oscillator at the proper frequency when such incoming signals are being properly converted to the desired intermediate-frequency. Assuming that a local oscillator is used, whose operating frequency is determined by control voltages, the above requirements can be met by a circuit which (1) in the absence of intermediate-frequency signals of the proper frequency, provides a saw-tooth voltage usable for sweeping the local oscillator repeatedly over its frequency range, and (2) when intermediate-frequency signals of the proper frequency are produced, stops the saw-tooth output and provides a substantially D.-C. signal which varies in relation to variations in the incoming signal frequency and thereby causes the local oscillator signals to accurately track the incoming signal.

Prior art circuits designed to accomplish the results discussed above have commonly relied on gas tubes controlled by complex vacuum tubes. In operation, when intermediate-frequency signals of the proper frequency are being produced, such gas tube circuits produce a small amplitude saw-tooth in place of a desired substantially D.-C. signal with amplitude varying with input frequency. Thus, under optimum performance such circuits do not lock the local oscillator at its proper frequency but cause the local oscillator to continually hunt over a small range. Other disadvantages have been the complexity and cost of these previous circuits.

It is an object of this invention, therefore, to provide an improved control circuit which avoids one or more of the disadvantages of the prior art arrangements.

It is a further object of this invention to provide an automatic local oscillator frequency control circuit of economical design utilizing semiconductor devices.

It is an additional object of this invention to provide an automatic local oscillator frequency control circuit which produces a stable D.-C. control signal when a desired intermediate-frequency signal is being produced.

In accordance with the invention, a control circuit producing a substantially D.-C. control signal output in response to an input signal of at least a minimum amplitude and a substantially saw-tooth signal output when the input signal falls below said minimum amplitude comprises, input means for accepting an input signal whose amplitude is representative of the operating condition of external apparatus which is to be controlled, a capacitor arranged to produce a substantially saw-tooth output if allowed to repeatedly charge and discharge, a switching device coupled to the capacitor and a source of potential and arranged to allow the capacitor to recharge each time the charge on the capacitor falls below a predetermined value, and means coupled to the switching device and the input means for supplying in response to the input signal a substantially D.-C. signal whose magnitude is determined by the input signal, this D.C. signal being effective to prevent the switching device from allowing the capacitor to recharge whenever the input signal exceeds said minimum amplitude and the D.-C. signal being available as a control signal output in this case. In this specification the term "capacitor" is used in a broad sense to indicate an electrical energy storage device and includes other suitable means in addition to common electrical capacitors.

For a better understanding of the present invention, together with other and further objects thereof, reference is had to the following description taken in connection with the accompanying drawing, and its scope will be pointed out in the appended claims.

In the drawing the sole figure is a circuit diagram, partly schematic, of radar receiving equipment including an automatic local oscillator frequency control circuit embodying the present invention.

Referring to the figure of the drawing, the radar receiving equipment illustrated comprises, in cascade, an antenna-ground circuit 10, 11, a radio-frequency amplifier 12, a frequency changer or mixer 13, an intermediate-frequency amplifier 14, and detection, amplification and indication circuits 15, which may include as the final element a radar indicator capable of pictorially displaying received radar information. The receiver also includes a frequency discriminator 16 arranged to demodulate intermediate-frequency signals produced by amplifier 14. The receiver further includes an automatic local oscillator frequency control circuit 17, in accordance with the invention, coupled to the output of discriminator 16; and a local oscillator 18, coupled to the output of control circuit 17 and arranged to supply a local oscillator signal to mixer 13. All of these components 10–18, with the exception of control circuit 17, may be of any available type of construction including one or more stages as required.

Neglecting for the moment the operation of the control circuit 17, the circuit above described comprises, in general, a simplified version of a conventional radar receiving apparatus. The operation of such equipment is well understood in the art so that a detailed description thereof is unnecessary. In brief, however, a signal intercepted by the antenna-ground circuit 10, 11 is selected and amplified in the radio-frequency amplifier 12 and applied to mixer 13 wherein it is converted into an intermediate-frequency signal. Assuming this intermediate-frequency signal to be within the allowable design frequency range, the signals will be amplified in the intermediate-frequency amplifier 14 and supplied to the detection, amplificaton and indication circuits 15. These circuits 15 process and amplify the signals which are finally used to produce a visual display or other result allowing monitoring of incoming radar information. The discriminator 16 receives intermediate-frequency signals produced by amplifier 14 and after demodulating these signals, supplies them to the control circuit 17. As will be described in detail, the control circuit 17 produces signals which are effective to either sweep the local oscillator over its frequency range or maintain the local oscillator at a desired frequency output. These results are obtained as the local oscillator 18 responds to the control potential supplied by circuit 17. The output signals produced by local oscillator 18 are coupled to the mixer 13, wherein they are used to convert or beat the radio-frequency signals supplied by amplifier 12 down to an intermediate-frequency acceptable to the intermediate-frequency amplifier 14. It should be appreciated that unless the local oscillator signals are of proper frequency with respect to the incoming radio-frequency signals, an intermediate-frequency will be produced which will not be within the design frequency range of the amplifier 14. Control circuit 17 is required to control the local oscillation frequency so that usable intermediate-frequency signals can be produced.

Referring now more particularly to control circuit 17 which embodies the present invention, the control circuit 17 comprises a capacitor in the form of common electrical capacitor 20, a switching device shown as switching diode 21 coupled to capacitor 20 through resistor 22 and also coupled to a source of potential +B, and means for supplying a substantially D.-C. signal in response to an input signal. These last means are shown as semiconductor rectifier 23 to which is coupled filtering means in the form of capacitor 24 and resistor 25; and repeater means including transistor 26, resistor 27 coupling the collector to ground, resistor 28 coupling the emitter to source +B and battery 29 coupling the emitter and base through resistors 25 and 28. Resistor 30 couples these last means to the capacitor and switching device previously discussed.

Considering now the operation of circuit 17, with no signals being supplied by discriminator 16, the circuit 17 functions as a sweep generator in the following manner. When the +B potential is applied this full potential appears across the series combination diode 21 and resistor 22. The diode is chosen to have characteristics such that it takes a large percentage of the complete supply potential to fire it. Capacitor 20 is charged through diode 21 and resistor 22 until the current through diode 21 reaches the minimum value (holding current) required to maintain the diode in its "on" state. When the current falls below this minimum value, diode 21 switches to its "off" state effectively disconnecting the +B supply from the series combination of resistor 22 and capacitor 20. Capacitor 20 then discharges through resistors 30 and 27 (the transistor 26 being biased off in the absence of incoming pulses). Capacitor 20 will continue to discharge until the voltage across diode 21 again reaches the firing level, at which time diode 21 switches to its "on" state and the sequence is repeated. The result is a saw-tooth wave form signal appearing at the output terminals 31.

If at any time, signals are supplied by discriminator 16 to input terminals 32, they are detected by rectifier 23, integrated by filtering means 24, 25 and amplified as a substantially D.-C. signal by the repeater means including transistor 26. It will be appreciated that this D.-C. signal will have an amplitude related to the signals supplied by the discriminator 16, which signals are in turn dependent on the frequency of the intermediate-frequency signals being produced. If the resulting substantially D.-C. signal applied to junction 33 is of a sufficient magnitude, it will prevent the diode 21 from reverting to its "on" state. In this case this D.-C. signal appearing at junction 33 is connected directly to the output terminals 31 and acts to hold the intermediate-frequency at a particular value. In this operating condition the local oscillator will smoothly track changes in the frequency of incoming signals by adjusting its frequency in accordance with error signals supplied by discriminator 16. If the input signals applied by discriminator 16 cease or fall below the minimum amplitude, the control circuit 17 will again provide a saw-tooth signal at its output terminals 31.

In operation of the complete receiving apparatus, the saw-tooth output signal causes the local oscillator frequency to be continually swept over its frequency range and if at any time in this sweeping process intermediate-frequency signals of the proper frequency are produced, these signals, as modified by discriminator 16, are effective to stop the sweeping process and lock the local oscillator at the desired frequency.

Following are descriptions of some of the more important components of one actual control circuit constructed in accordance with the invention:

| | |
|---|---|
| Capacitor 20 | .47 microfarad. |
| Diode 21 | Shockley type 4N50D. |
| Resistor 22 | 1000 ohms. |
| Transistor 26 | Delco type 2N174. |
| +B Potential | +60 volts. |
| Battery 29 | 1.5 volts. |

The particular type of diode used, required approximately 50 volts to fire, once fired it retained the "on" state until current flow through it diminished substantially thereby providing excellent operation in the manner already described. The particular type of diode described above is also known as a switching diode or four-layer diode. Other appropriate types of switching devices may be used as applicable in other forms of control circuits in accordance with the invention.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A control circuit producing a substantially D.-C. control signal output in response to an input signal of at least a minimum amplitude and a substantially saw-tooth signal output when the input signal falls below said minimum amplitude comprising: input means for accepting an input signal whose amplitude is representative of the operating condition of external apparatus which is to be controlled; a capacitor arranged to produce a substantially saw-tooth output if allowed to repeatedly charge and discharge; a switching device coupled to said capacitor and a source of potential, and arranged to allow the capacitor to recharge each time the charge on said capacitor falls below a predetermined value; and means coupled to said switching device and said input means for supplying in response to said input signal a substantially D.-C. signal whose magnitude is determined by said input signal, said D.-C. signal being effective to prevent the switching device from allowing the capacitor to recharge whenever the input signal exceeds said minimum amplitude and said D.-C. signal being available as a control signal output in this case.

2. A control circuit producing a substantially D.-C. control signal output in response to an input signal of at least a minimum amplitude and a substantially saw-tooth signal output when the input signal falls below said minimum amplitude comprising: input means for accepting an input signal whose amplitude is representative of the operating condition of external apparatus which is to be controlled; a capacitor arranged to produce a substantially saw-tooth output if allowed to repeatedly charge and discharge; a four-layer diode coupling said capacitor to a source of potential and arranged to act as a switch allowing the capacitor to recharge each time the charge on said capacitor falls below a predetermined value; filtering means coupled to said input means for deriving from said input signal a substantially D.-C. signal the amplitude of which is determined by the amplitude of said input signal; and repeater means coupled to said filter means for coupling said D.C. signal to said capacitor so as to prevent the charge on the capacitor from falling below said predetermined value whenever the input signal exceeds said minimum amplitude, said D.-C. signal being available as a control signal output in this case.

3. An automatic local oscillator frequency control circuit producing a substantially D.-C. control signal output in response to a demodulated received signal and a substantially saw-tooth signal output when no demodulated signal is present comprising: a capacitor arranged to produce a substantially saw-tooth output suitable for sweeping the frequency of a local oscillator if said capacitor is allowed to repeatedly charge and discharge; a switching device coupled to said capacitor and a source of potential, and arranged to allow the capacitor to recharge each time the charge on said capacitor falls below a predetermined value; and means coupled to said switching device for deriving a substantially D.-C. signal from a demodulated received signal, said D.C. signal being effective to prevent the switching device from allowing the capacitor to recharge when a demodulated received signal is present and said D.-C. signal being used to maintain the local oscillator at a proper frequency in this case.

4. An automatic local oscillator frequency control circuit producing a substantially D.-C. control signal output in response to a demodulated received signal and a substantially saw-tooth signal output when no demodulated signal is present comprising: a capacitor arranged to produce a substantially saw-tooth output suitable for sweeping the frequency of a local oscillator if said capacitor is allowed to repeatedly charge and discharge; a switching device coupled to said capacitor and a source of potential, and arranged to allow the capacitor to recharge each time the charge on said capacitor falls below a predetermined value; and means coupled to said capacitor for deriving a substantially D.-C. signal from a demodulated received signal, said D.-C. signal being effective to prevent the charge on the capacitor from falling below said predetermined value when a demodulated received signal is present and said D.-C. signal being used to maintain the local oscillator at a proper frequency in this case.

5. An automatic local oscillator frequency control circuit producing a substantially D.-C. control signal output in response to a demodulated received signal and a substantially saw-tooth signal output when no demodulated signal is present comprising: a capacitor arranged to produce a substantially saw-tooth output suitable for sweeping the frequency of a local oscillator if said capacitor is allowed to repeatedly charge and discharge; a switching diode coupled to said capacitor and a source of potential and arranged to allow the capacitor to recharge each time the charge on said capacitor falls below a predetermined value; filtering means for deriving a substantially D.-C. signal from a demodulated received signal; and repeater means coupled to said filtering means for coupling said D.C. signal to said capacitor so as to prevent the charge on the capacitor from falling below said predetermined value when a demodulated received signal is present and said D.-C. signal being used to maintain the local oscillator at a proper frequency in this case.

6. An automatic local oscillator frequency control circuit producing a substantially D.-C. control signal output in response to a demodulated received signal and a substantially saw-tooth signal output when no demodulated signal is present comprising: a capacitor arranged to produce a substantially saw-tooth output suitable for sweeping the frequency of a local oscillator if said capacitor is allowed to repeatedly charge and discharge; a four-layer diode coupling said capacitor to a source of potential and arranged to act as a switch allowing the capacitor to recharge each time the charge on said capacitor falls below a predetermined value; and means coupled to said capacitor for deriving a substantially D.-C. signal from a demodulated received signal, said D.C. signal being effective to prevent the charge on the capacitor from falling below said predetermined value when a demodulated received signal is present and said D.-C. signal being used to maintain the local oscillator at a proper frequency in this case.

References Cited in the file of this patent

UNITED STATES PATENTS

| | | |
|---|---|---|
| 2,725,476 | Hugenholtz | Nov. 29, 1955 |
| 2,896,169 | Howell | July 21, 1959 |
| 2,980,863 | Hussey | Apr. 18, 1961 |
| 3,015,784 | Cirone | Jan. 2, 1962 |